(12) United States Patent
Welsh et al.

(10) Patent No.: US 6,792,177 B2
(45) Date of Patent: Sep. 14, 2004

(54) OPTICAL SWITCH WITH INTERNAL MONITORING

(75) Inventors: David Edward Welsh, Yorba Linda, CA (US); Roger Jonathan Helkey, Montecito, CA (US); Adrian Keating, Santa Barbara, CA (US); Daniel Jacob Blumenthal, Santa Barbara, CA (US); Walter Joseph Fant, Los Gatos, CA (US)

(73) Assignee: Calient Networks, Inc., San Jose, CA (US)

( * ) Notice: Subject to any disclaimer, the term of this patent is extended or adjusted under 35 U.S.C. 154(b) by 103 days.

(21) Appl. No.: 09/805,528

(22) Filed: Mar. 12, 2001

(65) Prior Publication Data

US 2002/0126949 A1 Sep. 12, 2002

(51) Int. Cl.⁷ .................................................. G02B 6/42
(52) U.S. Cl. ........................................................ 385/18
(58) Field of Search .............................. 385/18, 20, 16, 385/17, 15, 14, 33, 47, 52, 73; 359/290, 291, 298

(56) References Cited

U.S. PATENT DOCUMENTS

| | | | |
|---|---|---|---|
| 3,492,484 A | 1/1970 | Iti | |
| 3,649,105 A | 3/1972 | Treuthart | |
| 4,208,094 A | 6/1980 | Tomlinson, III et al. | |
| 4,243,297 A | 1/1981 | Elion | |
| 4,365,863 A | 12/1982 | Broussaud | |
| 4,498,730 A | 2/1985 | Tanaka et al. | |

(List continued on next page.)

FOREIGN PATENT DOCUMENTS

| | | |
|---|---|---|
| DE | 19757181 A1 | 7/1999 |
| EP | 0 834759 A2 | 4/1998 |
| EP | 0 916983 A1 | 5/1999 |
| EP | 0 980014 A1 | 2/2000 |
| EP | 1 120677 A2 | 8/2001 |
| GB | 2 175 705 A | 12/1986 |
| GB | 2 275 787 A | 9/1994 |
| GB | 2 328 312 A | 2/1999 |
| JP | 60-107017 | 6/1985 |
| JP | 5-107485 A | 4/1993 |
| JP | 6-180428 | 6/1994 |
| JP | 2000-19434 A | 1/2000 |
| WO | WO 99/66354 | 12/1999 |
| WO | WO 99/67666 | 12/1999 |
| WO | WO 00/20899 | 4/2000 |
| WO | WO 01/33898 | 5/2001 |

OTHER PUBLICATIONS

"Lucent's New All–Optical Router Uses Bell Labs Microscopic Mirrors," Bells Labs press release, pp. 1–4, Nov. 10, 1999. http://www.bell–labs.com/news/1999/november/10/1.html.

(List continued on next page.)

Primary Examiner—Jean F. Duverne
(74) Attorney, Agent, or Firm—Blakely, Sokoloff, Taylor & Zafman LLP

(57) ABSTRACT

The invention provides an optical switch comprising a housing, an input optical fiber, a mirror substrate, an input pivoting mirror, an output optical fiber, a first optical splitter, and a first optical detector. The input optical fiber propagates a light beam and is secured to the housing. The mirror substrate is secured to the housing. The input pivoting mirror is located in a path of the light beam after leaving the input optical fiber. The input pivoting mirror is pivotally secured to the mirror substrate. Pivoting of the mirror relative to the mirror substrate alters an angle with which the light beam is reflected therefrom. The output optical fiber is secured to the housing and has an end through which the light beam enters after being reflected by the input pivoting mirror. The first optical splitter is located in a path of the light beam after leaving the input optical fiber. The first optical splitter splits the light beam into a first propagated portion and a first monitoring portion. The first propagated portion is propagated through the output optical fiber and the first monitoring portion is detected by the first optical detector.

56 Claims, 8 Drawing Sheets

U.S. PATENT DOCUMENTS

| | | |
|---|---|---|
| 4,626,066 A | 12/1986 | Levinson |
| 4,848,999 A | 7/1989 | Taylor |
| 4,892,388 A | 1/1990 | Taylor |
| 4,923,273 A | 5/1990 | Taylor |
| 4,941,724 A | 7/1990 | Couden et al. |
| 5,083,857 A | 1/1992 | Hornbeck |
| 5,097,354 A | 3/1992 | Goto |
| 5,172,262 A | 12/1992 | Hornbeck |
| 5,204,922 A | 4/1993 | Weir et al. |
| 5,235,187 A | 8/1993 | Arney et al. |
| 5,444,566 A | 8/1995 | Gale et al. |
| 5,450,512 A | 9/1995 | Asakura |
| 5,488,862 A | 2/1996 | Neukermans et al. |
| 5,524,153 A | 6/1996 | Laor |
| 5,555,330 A | 9/1996 | Pan et al. |
| 5,555,558 A | 9/1996 | Laughlin |
| 5,600,383 A | 2/1997 | Hornbeck |
| 5,608,468 A | 3/1997 | Gove et al. |
| 5,629,790 A | 5/1997 | Neukermans et al. |
| 5,648,618 A | 7/1997 | Neukermans et al. |
| 5,661,591 A | 8/1997 | Lin et al. |
| 5,673,139 A | 9/1997 | Johnson |
| 5,726,073 A | 3/1998 | Zhang et al. |
| 5,808,780 A | 9/1998 | McDonald |
| 5,872,880 A | 2/1999 | Maynard |
| 5,912,608 A | 6/1999 | Asada |
| 5,920,417 A | 7/1999 | Johnson |
| 5,943,157 A | 8/1999 | Florence et al. |
| 6,262,827 B1 | 7/2001 | Ueda et al. |
| 6,278,812 B1 | 8/2001 | Lin et al. |
| 6,289,145 B1 | 9/2001 | Solgaard et al. |
| 6,295,154 B1 | 9/2001 | Laor et al. |
| 6,320,993 B1 | 11/2001 | Laor |
| 6,330,102 B1 | 12/2001 | Daneman et al. |
| 6,396,975 B1 | 5/2002 | Wood et al. |
| 6,396,976 B1 | 5/2002 | Little et al. |
| 6,466,711 B1 * | 10/2002 | Laor et al. .................. 385/18 |
| 6,549,691 B1 * | 4/2003 | Street et al. ................. 385/18 |
| 6,549,692 B1 * | 4/2003 | Harel et al. .................. 385/18 |

OTHER PUBLICATIONS

M. Adrian Michalicek, Wenge Zhang, Kevin F. Harsh, Victor M. Bright, and Y.C. Lee, "MIcromirror Arrays Fabricated by Flip–Chip Assembly," Part of the SPIE Conference on Miniaturizes Systems with Micro–Optics and MEMs, Santa Clara, SPIE vol. 3878, pp. 68–79 (Sep. 1999).

Lih Y. Lin and Evan L. Goldstein, "Micro–Electro–Mechanical Systems (MEMs) for WDM Optical Crossconnect Networks," IEEE, pp. 954–957 (1999).

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. MIkkelsen, F. Pardo, G. Raybon, R. Ruel, R.E. Scotti, T.W. Van Blarcum, , L. Zhang, and C.R. Giles, "Fully Provisional 112 ×112 MIcro–Mechanical Optical Crossconnect With 35.8Tb/s Demonstrated Capacity," OFC 2000 Tech. Dig., Baltimore, Maryland, pp. 202–204 (Mar. 7–10, 2000).

* cited by examiner

OPTICAL SWITCH WITH INTERNAL MONITORING

FIELD OF THE INVENTION

This invention relates to an optical switch for a fiber optic network.

BACKGROUND

Optical switches can be used in optical networks to switch light beams from input optical fibers to output optical fibers. A mirror substrate is provided having a plurality of input pivoting mirrors and output pivoting mirrors thereon. A respective input pivoting mirror is located in a path of a respective light beam being propagated by a respective input optical fiber. The input pivoting mirror is pivotable relative to the mirror substrate to alter an angle at which the light beam is reflected therefrom. The angle is controlled so that the light beam falls on a respective output pivoting mirror in line with a respective output optical fiber to which the light beam is to be switched. The output pivoting mirror then reflects the light beam and is pivoted so as to ensure that the light beam is propagated in a direction in which the output optical fiber extends, to ensure coupling of the light beam into the output optical fiber.

SUMMARY OF THE INVENTION

Proper functioning of such a switch depends on correct functioning of the input pivoting mirrors and the output pivoting mirrors. No diagnosis or control of the switch can be carried out if there is no feedback that indicates how the pivoting mirrors function. Other applications may exist for the ability to monitor operation of a switch.

An optical switch is described comprising an input optical fiber, a mirror substrate, an input pivoting mirror, an output optical fiber, a first optical splitter, and a first optical detector. The input optical fiber propagates a light beam. The mirror substrate is secured to the housing. The input pivoting mirror is located in a path of the light beam after leaving the input optical fiber. The input pivoting mirror is pivotally secured to the mirror substrate. Pivoting of the mirror relative to the mirror substrate alters an angle with which the light beam is reflected therefrom. The output optical fiber has an end through which the light beam enters after being reflected by the input pivoting mirror. The first optical splitter is located in a path of the light beam after that signal leaves the input optical fiber. The first optical splitter splits the light beam into a first propagated portion and a first monitoring portion. The first propagated portion is propagated through the output optical fiber and the first monitoring portion is detected by the first optical detector.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
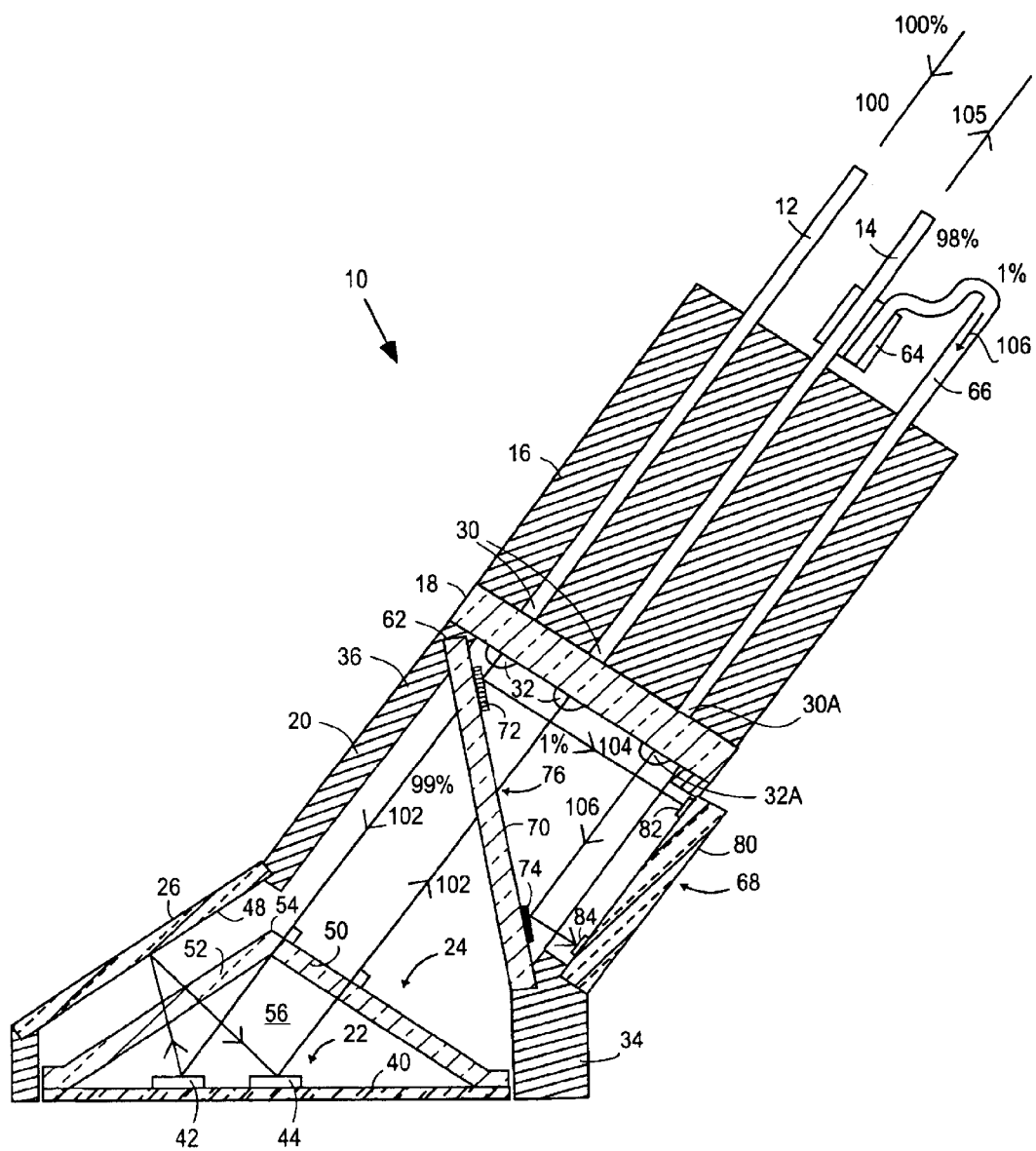
FIG. 1 is a cross-sectioned view of an optical switch according to one embodiment of the invention.

FIG. 1 of the accompanying drawings illustrates an optical switch 10 according to an embodiment of the invention. The switch 10 includes a plurality (other embodiments may have only one) of input optical fibers 12 (one of which is shown), a plurality (other embodiments may have only one) of output optical fibers 14 (only one of which is shown), switching components used to switch light from selected ones of the input optical fibers 12 to selected ones of the output optical fibers 14, and monitoring components used to monitor operation of switching components.

The switching components include a fiber block 16, a lens plate 18, a component housing 20, a mirror array 22, a transmissive mirror array cover 24, and a reflective substrate 26.

An optical fiber has a range of wavelengths that it can carry. In the present example, each optical fiber 12 or 14 is capable of carrying light with wavelengths from approximately 1100 nanometers (nm) to about 1700 nm. Light having a wavelength falling outside this range cannot be carried by the fibers 12 or 14.

The fiber block 16 has a plurality of openings therethrough. Each optical fiber 12 or 14 is inserted into one side of the respective opening in the fiber block 16 until an end 30 thereof is located at an opposing side of the fiber block 16.

A plurality of collimating lenses 32 are formed on the lens plate 18. The lens plate 18 is mounted to the fiber block 16 in a position wherein each collimating lens 32 is located over a respective end 30 of a respective optical fiber 12 or 14 on an opposing side of the lens plate 18. To reduce the loss at the interface, fibers 12 or 14 may be bonded to lens plate 18 or otherwise index matched.

The switch housing 20 includes a base 34 and a top portion 36. The base 34 is located on a reference surface and the top portion extends from the base 34 at an angle of approximately 55° with respect to reference. The lens plate 18 is mounted to an upper end of the top portion 36 in a position wherein each one of the optical fibers 12 or 14 is located at an angle of approximately 55° with respect to reference. Other angles may work for other embodiments. The switch may alternatively be designed such that the fibers are located at angles ranging from 45° to 70° to the reference.

The mirror array 22 includes a substrate 40, a plurality of input pivoting mirrors 42 (one of which is shown), and a plurality of output pivoting mirrors 44 (one of which is shown). The mirror substrate 40 is mounted to the base 34 such that the mirror substrate 40 extends in a reference plane. Each one of the pivoting mirrors 42 or 44 is pivotally mounted to the mirror substrate 40. Electrostatic actuators (not shown) are located in the mirror substrate 40. A voltage can be applied to each one of the electrostatic actuators to cause pivoting of a respective pivoting mirror 42 or 44.

The reflective substrate 26 has a reflective surface 48. The reflective substrate 26 is secured over an opening in the component housing 20 in a position wherein the reflective surface 48 is at approximately 35° relative to reference. This angle will normally be the complement of the fiber angle.

The transmissive mirror array cover 24 includes first and second panels 50 and 52, respectively, which meet at an apex 54. The transmissive mirror array cover 24 is located over the mirror substrate 40 so that an enclosure 56 is defined between the panels 50 and 52 and the mirror substrate 40. The enclosure 56 is substantially sealed against ingress of contaminants so that the pivoting mirrors 42 and 44 are protected. The panels 50 and 52 both have inner and outer surfaces that are inclined at approximately 35° with respect to reference, which angle is also complementary to the fiber angle.

The monitoring components include a beam splitter 62, a plurality of output optically splitting couplers 64 (one of which is shown), a plurality of monitoring optical fibers 66 (one of which is shown), and a photodetector array 68.

The beam splitter 62 includes a transmissive substrate 70 having formed thereon a first, partially transmissive optical splitter mirror 72 and a second, entirely reflective mirror 74. The optical splitter mirror 72 and the reflective mirror 74 are located on the transmissive substrate 70 in positions wherein they do not block optical transmission through a transmissive portion 76 of the transmissive substrate 70. The transmissive substrate 70 is a planar substrate that is mounted to the component housing 20 at an angle that is approximately 45° with respect to a direction of an optical axis of the optical fibers 12 or 14, with the optical splitter mirror 72 and the reflective mirror 74 located on the same side of the transmissive substrate 70 as the optical fibers 12 and 14.

The coupler 64 is located on the output optical fiber 14 and the monitoring optical fiber 66 has one end also connected to the coupler 64. An opposing end of the monitoring optical fiber is inserted through an opening in the fiber block 16 until an end 32A thereof is located on an opposing side of the fiber block 16. It will be understood that this arrangement schematically represents other equivalent paths that could be constructed by splitting fibers or joining them with connectors. Another collimating lens 32A is located on the lens plate 18 over the end 30A.

The photodetector array 68 includes a photodetector array substrate 80 having formed thereon an input detector 82 and an output detector 84. The photodetector array substrate 80 is secured to the component housing over an opening thereof and extends at an angle that is at approximately 45° relative to the transmissive substrate 70. The photodetector array 68 is located on the same side of the transmissive substrate 70 as the optical splitter mirror 72 and the reflective mirror 74.

In use, a light beam 100 is propagated through the input optical fiber 12 and is radiated from the end 30 of the input optical fiber 12 through the lens plate 18. The light beam 100 then propagates through the collimating lens 32 located over the end 30 of the input optical fiber 12, which collimates the light beam 100.

The light beam 100 then propagates onto the optical splitter mirror 72. The optical splitter mirror 72 is partially transmissive and partially reflective so that an input propagated portion 102 of the light beam 100 propagates through the optical splitter mirror 72 and an input monitoring portion 104 is reflected by the optical splitter mirror 72. The optical splitter mirror may for example be 99% transmissive and 1% reflective so that the input propagated portion 102 comprises about 99% of the light beam 100 and the input monitoring portion 104 comprises about 1% of the light beam 100. The input monitoring portion 104 is propagated onto the input detector 82. The input detector 82 is a photodetector that generates a signal when light falls thereon so that a signal is generated when the input monitoring portion 104 falls onto the input detector 84.

The input propagated portion 102 includes the entire range of wavelengths, i.e. from approximately 1100 nm to approximately 1700 nm, of the light. The input monitoring portion 104 also includes the entire range of wavelengths, i.e. also from approximately 1100 nm to approximately 1700 nm.

The input propagated portion 102 propagates from the optical splitter mirror 72 through the transmissive substrate 70 and then through the top portion 36 of the component housing 20 onto the first panel 50. The first panel 50 has an outer inclined surface at a surface-light beam angle of approximately 90° relative to the input propagated portion 102 so that there is minimal distortion when the input propagated portion 102 propagates through the first panel 50.

The input propagated portion 102 propagates through the first panel 50 onto the input pivoting mirror 42, from where the input propagated portion 102 is reflected through the second panel 52. Surfaces of the second panel 52 are sufficiently close to normal to the output monitoring portion 102 when propagating therethrough so as to cause minimal distortion of the output monitoring portion 102.

The input propagated portion 102 is then reflected by the reflective surface 48 back through the second panel 52 onto the output pivoting mirror 44. Although only one output pivoting mirror 44 is shown, there are a plurality of output pivoting mirrors. Pivoting of the input pivoting mirror 42 allows for a change in the angle of the input propagated portion 102 reflected therefrom, with a corresponding change in the output pivoting mirror onto which the respective input propagated portion 102 falls.

The input propagated portion 102 then reflects off the respective output pivoting mirror 44 through the first panel 50. The output pivoting mirror 44 is pivoted so that the input propagated portion 102 being reflected thereby propagates at substantially right angles to the inclined surfaces of the first panel 50. The input propagated portion 102 then propagates through the transmissive portion 76 of the transmissive substrate 70, whereafter the input propagated portion 102 is focused by one of the collimating lenses 32 and propagates through the lens plate 18 onto the end 30 of the output optical fiber 14. Although only one output optical fiber 14 is shown, there are a plurality of output optical fibers. The output pivoting mirror 44 is pivoted so as to ensure that the input propagated portion 102 radiates in a direction in which the output optical fiber 14 extends from the end 30 thereof, thereby ensuring proper coupling of the input propagated portion 102 into the end of the output optical fiber 14. A respective output pivoting mirror is typically aligned with each respective output optical fiber for this purpose.

The coupler 64 is located in the output optical fiber 14 and splits the input propagated portion 102 into an output propagated portion 105 and an output monitoring portion 106. The output propagated portion 105 is propagated from the coupler 64 through the output optical fiber 14 and the output monitoring portion 106 is propagated through the monitoring optical fiber 66. The input propagated portion 102 is typically split by the coupler 64 so that about 99% of the input propagated portion 102 (98% of the light beam 100) comprises the output propagated portion 105 and about 1% of the input propagated portion 102 (1% of the light beam 100) comprises the output monitoring portion 106.

The output propagated portion 105 includes the entire range of wavelengths, i.e. from approximately 1100 nm to approximately 1700 nm, of the light. The output monitoring portion 106 also includes the entire range of wavelengths, i.e. also from approximately 1100 nm to approximately 1700 nm.

The output monitoring portion 106 provides an indication of the output propagated portion 105. A malfunction of the switching components of the switch 10 can be detected by measuring the output monitoring portion 106. It may, for example, occur that the input pivoting mirror 42 or the ouptut pivoting mirror 44 malfunction. Such a malfunction would then be detected by detecting the output monitoring portion 106. Moreover, because the coupler 64 is located in the output optical fiber 14, the output monitoring portion 106 will also provide an indication whether proper coupling of the input propagated portion 102 occurs at the end 30 of the output optical fiber 14.

The output monitoring portion 106 is propagated through the monitoring optical fiber 66 and out of the end 30A thereof, and from there through the lens plate 18, whereafter the collimating lens 32A collimates the output monitoring portion 106. The output monitoring portion 106 then propagates through the top portion 36 of the component housing 20 and is reflected by the reflective mirror 74. The reflective mirror 74 reflects the output monitoring portion 106 onto the output detector 84. The output detector 84 is also a photodetector like the input detector 82, and converts the output monitoring portion 106 to an electrical signal. By detecting both the input monitoring portion 104 with the input detector 82 and the output monitoring portion 106 with the output detector 84, a comparison can be made between the light beam 100 and the output propagated portion 105. Such a comparison can be used for controlling the pivoting mirrors 42 and 44.

Figure 2:
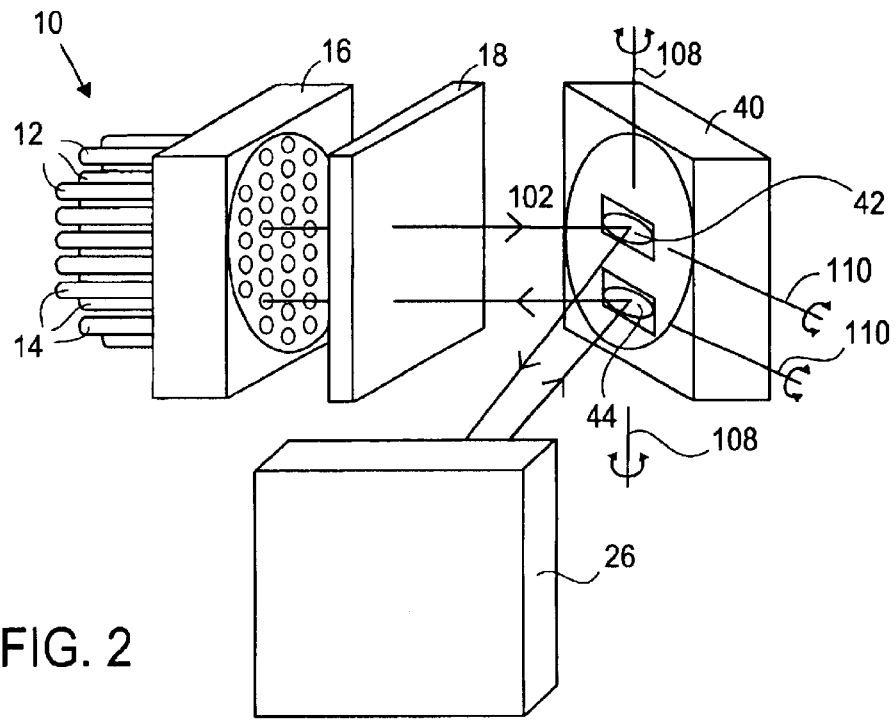
FIG. 2 is a perspective view of switching components of the switch.
Figure 3:
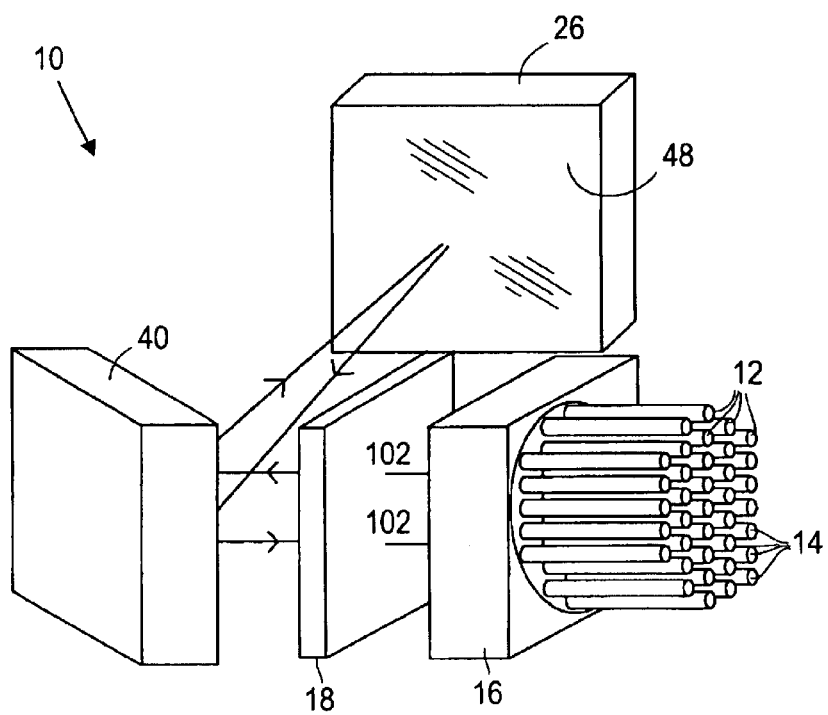
FIG. 3 is a perspective view from an opposing side of the switching components.

FIGS. 2 and 3 illustrate the operation of the switching components of the switch 10 in more detail. A plurality of input optical fibers 12 and a plurality of output optical fibers 14 are provided. A respective collimating lens is located on the lens plate 18 over each one of the optical fibers 12 and 14. An input pivoting mirror 42 is located on the mirror substrate 40 in line with each one of the input optical fibers and an output pivoting mirror 44 is located in line with each one of the output optical fibers 14. Each mirror 42 or 44 can pivot about a respective first axis 108 and about a respective second axis 110 at right angles to the first axis 108.

FIGS. 2 and 3 illustrate the plurality effect of the switching components of the switch 10. The plurality effect also applies to the monitoring components of the switch 10. There are a plurality of couplers such as the coupler 64 in FIG. 1, a plurality of monitoring optical fibers such as the monitoring optical fiber 66, a plurality of collimating lenses such as the collimating lens 32A, a plurality of input detectors such as the input detector 82, and a plurality of output detectors such as the output detector 84. Each coupler is connected to a respective output optical fiber, each monitoring optical fiber is connected to a respective coupler, and a respective collimating lens is located over a respective end of a respective monitoring optical fiber. Furthermore, each input optical fiber propagates a respective light beam. A respective light beam is separated into a respective input propagated portion and a respective input monitoring portion that is received by a respective input detector. A respective input propagated portion is separated by a respective coupler into a respective output propagated portion and a respective output monitoring portion. Each output monitoring portion is received by a respective output detector.

Figure 4:
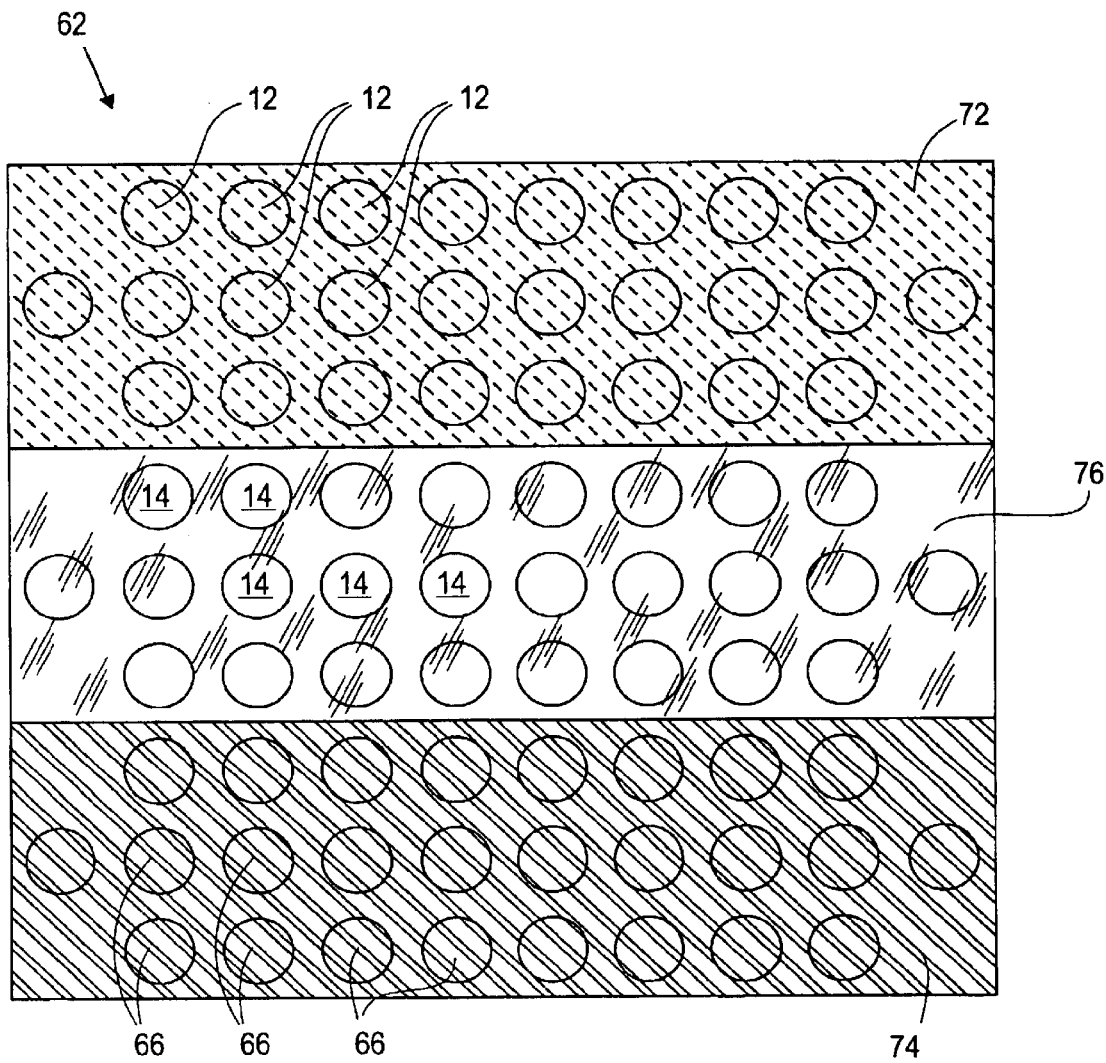
FIG. 4 is a front view of a transmissive substrate having layers formed thereon, forming part of the switch.

FIG. 4 illustrates the beam splitter arrangement 62 as it relates to the plurality effect. An entire area of the transmissive substrate 70 in line with ends of all of the input optical fibers 12 is covered with the optical splitter mirror 72. An entire area of the transmissive substrate 70 in line with ends of all the monitoring optical fibers 66 is covered with the reflective mirror 74. The transmissive portion 76 covers an entire area over ends of all the output optical fibers 14.

Figure 5:
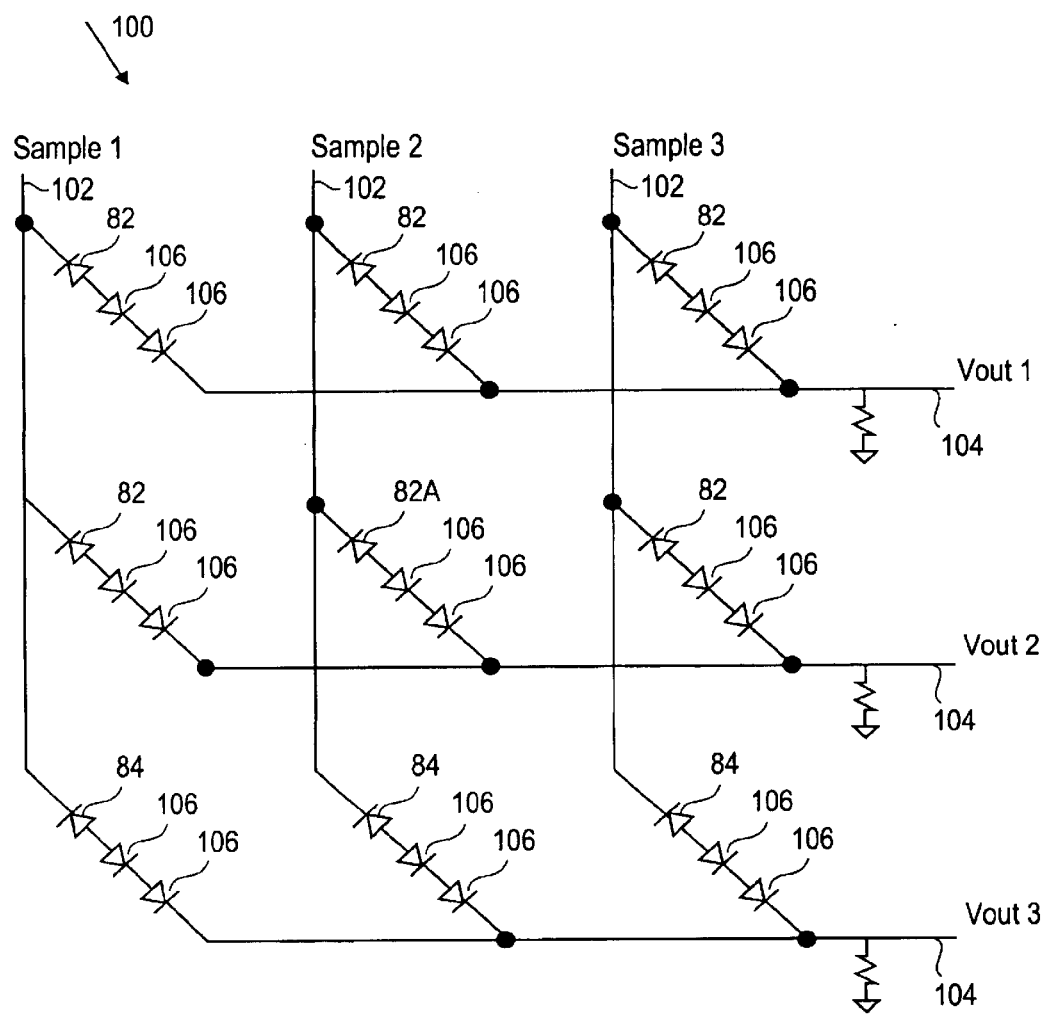
FIG. 5 is an electrical diagram of an array of photodetectors of the switch.

FIG. 5 illustrates an electrical circuit 100 including a plurality of photodetectors 82 and 84, a plurality of sample lines 102, and a plurality of output lines 104. The photodetectors 82 and 84 are located in rows and column. Each sample line 102 connects a respective column of the photodetectors 82 and 84 to one another and a respective output line 104 connects a respective row of the photodetectors to one another. Light shining, for example, on photodetector 82A is detected on output line named Vout 2 when a voltage is applied to sample line named Sample 2. Because of the row-and-column configuration, provision is only made for a number of sample lines 102 and a number of output lines 104 wherein the sample lines 102 multiplied by the output lines 104 equals the number of photodiodes. Two reverse bias diodes 106 are also located between a respective photodiode 82 or 84 and a respective output line 104. The diodes 106 prevent flow of current through other photodiodes in the same column on which light does not fall.

In the descriptions of the embodiments that follow, for purposes of efficacy, not all details thereof are described and discussed in detail. Instead, the description of each of the embodiments that follow primarily indicates differences between the specific embodiment described and an embodiment or embodiments that have been described previously. Unless specifically stated otherwise or unless it can be inferred, therefore, it can be assumed that the undescribed details of subsequent embodiments are the same as corresponding details of embodiments that have been described previously.

Figure 6:
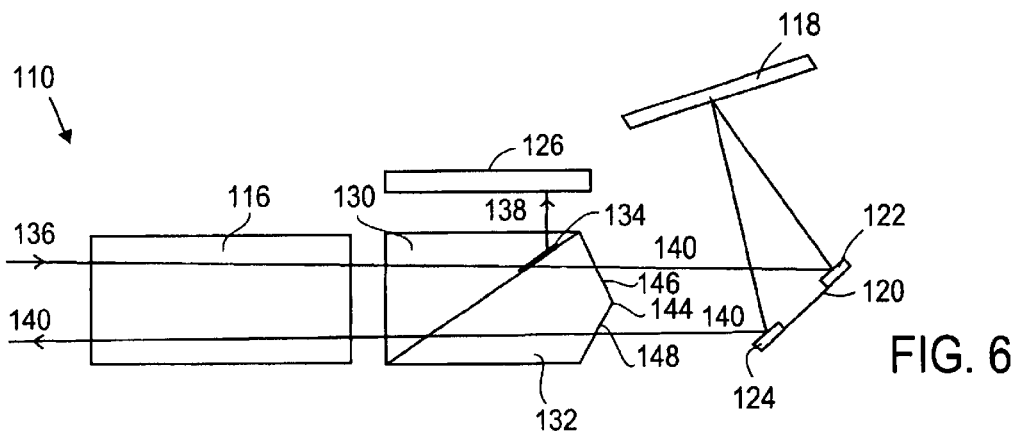
FIG. 6 is a cross-sectioned view of a switch, having transmissive components with a partially transmissive layer between inclined surfaces of the transmissive components, one of the transmissive components having a surface that causes convergence of light.

FIG. 6 illustrates a switch 110 according to one alternative embodiment of the invention. The switch 110 also includes a fiber block 116, a reflective substrate 118, a mirror substrate 120, input pivoting mirrors 122, output pivoting mirrors 124, and a photodetector array 126. These components are the same as in the embodiment of FIG. 1.

The switch 110 further includes a first transparent component 130 and a second transparent component 132. A partially transmissive mirror 134 is formed in a layer on an inclined surface of the first transmissive sub-component 130. An inclined surface of the second transmissive component 132 is then located against the layer 134 and the second transmissive component 132 is secured to the first transmissive component 130.

The two components 130 and 132 are located in a path of a light beam 136 such that the layer 134 is located at an angle of approximately 45° relative to a direction of the light beam 136. A monitoring portion 138 of the light beam 136 is reflected by the layer 134 towards the photodetector array 126 where it is received, and a propagated portion 140 of the light beam 136 is propagated through the layer 134. The propagated portion 140 then enters the second transmissive component 132 through the inclined surface behind the layer 134, whereafter it propagates through the second transmissive component 132, and then leaves the second transmissive component 132 through a second surface 144 thereof. The second surface 144 has two inclined sections 146 and 148 respectively. The section 146 is at an angle between 0° and approximately 90° with respect to the propagated portion 140 before it leaves the section 146, and the second section 148 is at an angle between approximately 90° and 180° with respect to the propagated portion 140 before it enters the section 148. Because the sections 146 and 148 are inclined, the propagated portion 140 converges in a direction away from the surface 144 towards the pivoting mirrors 122 and 124. Although only one light beam is shown, there are a plurality of light beams. Each respective light beam first passes through the first section 146 and then passes through the second section 148.

Figure 7:
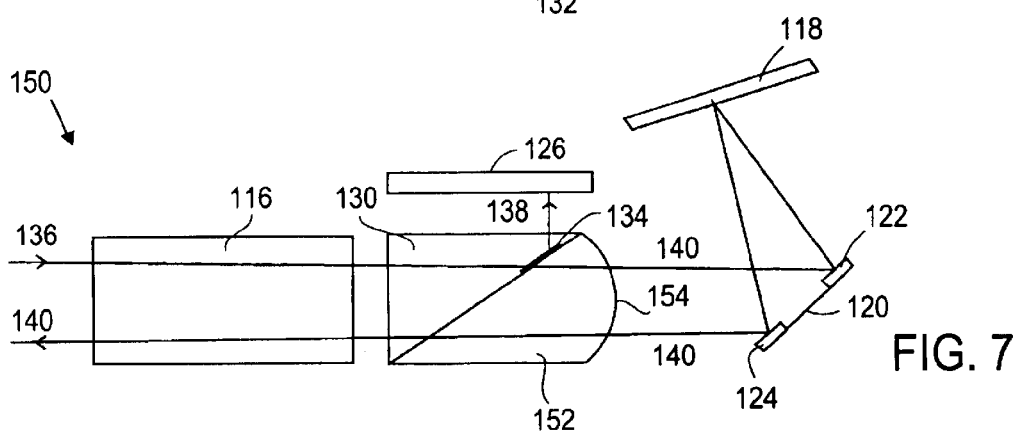
FIG. 7 is a cross-sectional view of a switch wherein a transmissive component thereof has a surface that causes both convergence and collimating of light.

For of the embodiment of FIG. 6, the surface 144 does not make provision for collimating of the light beam 136. FIG. 7 illustrates a switch 150 that is a modification of the switch 110 of FIG. 6. The switch 150 has a first transmissive component 152 having a second surface 154 that is curved. The curvature of the surface 154 makes provision for collimating of a light beam 136 and for convergence of a propagated portion 140 of the light beam 136 in a direction from the surface 154 towards pivoting mirrors 122 and 124. The switches 150 of FIG. 7 and 110 of FIG. 6 substantially are the same in other respects.

Figure 8:
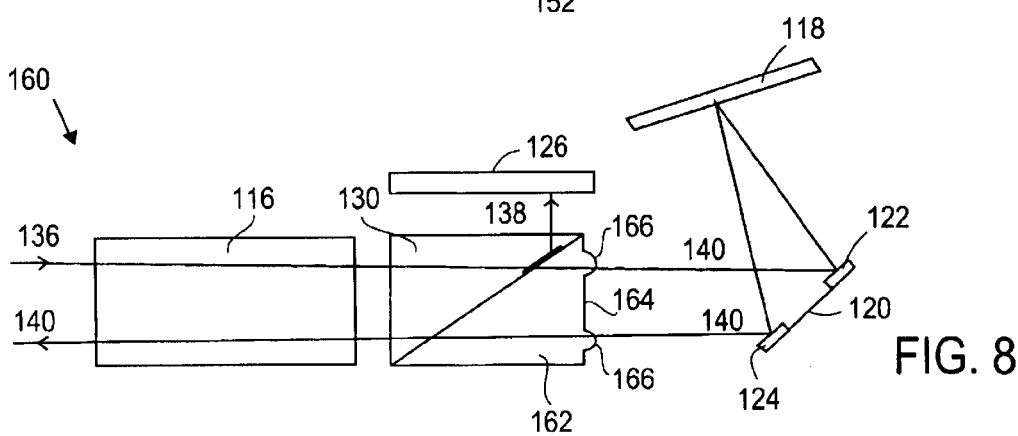
FIG. 8 is a cross-sectional view of a switch wherein a surface of a propagated component thereof has a plurality of individual collimating lenses.

The surface 154 in FIG. 7 serves a dual purpose—namely to focus light and to converge light. FIG. 8 illustrates a switch 160 that is a modification of the switch 150 of FIG. 7. The switch 160 has a second transmissive component 162 with a second surface 164 having a plurality of individual collimating lenses 166 formed thereon. A light beam 136 passes through one of the collimating lenses 166 upon exiting from the second transmissive component 162, and then passes through another one of the collimating lenses 166 upon entering into the second transmissive component 162. The surface 164 has an intended advantage that the collimating nature of the collimating lenses 166 can be designed independently of the convergence effect of the surface 164. Although not shown in FIG. 8, there are a plurality of light beams and there are two collimating lenses 166 for each respective light beam.

Figure 9:
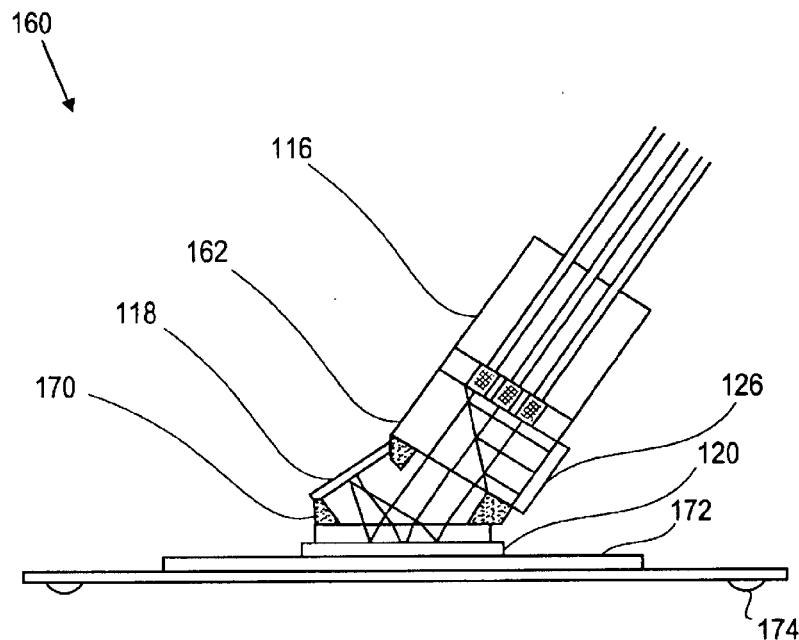
FIG. 9 is a cross-sectional side view of a mechanical construction of the switch of FIG. 8.

FIG. 9 illustrates the mechanical construction of the switch 160 of FIG. 8. The switch 160 includes a housing 170 but only includes a base such as the base 34 of the switch 10 of FIG. 1 and no top portion. Instead, the second transmissive component 162 is mounted directly over an opening of the housing 170. FIG. 9 also shows that the mirror substrate 120 is mounted to a package substrate 172. A plurality of solder balls 174 are located on a lower surface of the substrate 172, through which signals can be provided to the mirror substrate 120.

Figure 10:
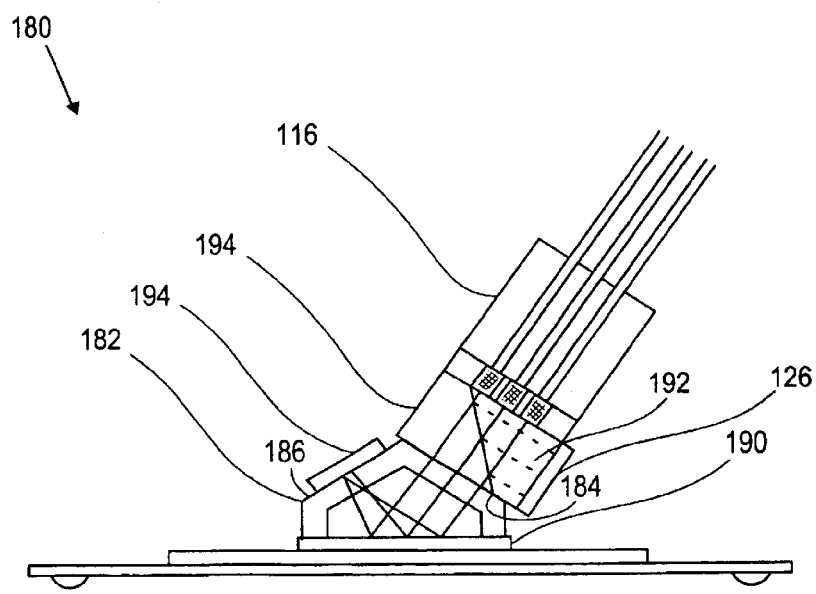
FIG. 10 is a cross-sectional side view of a mechanical construction of a switch having a transmissive housing.
Figure 11:
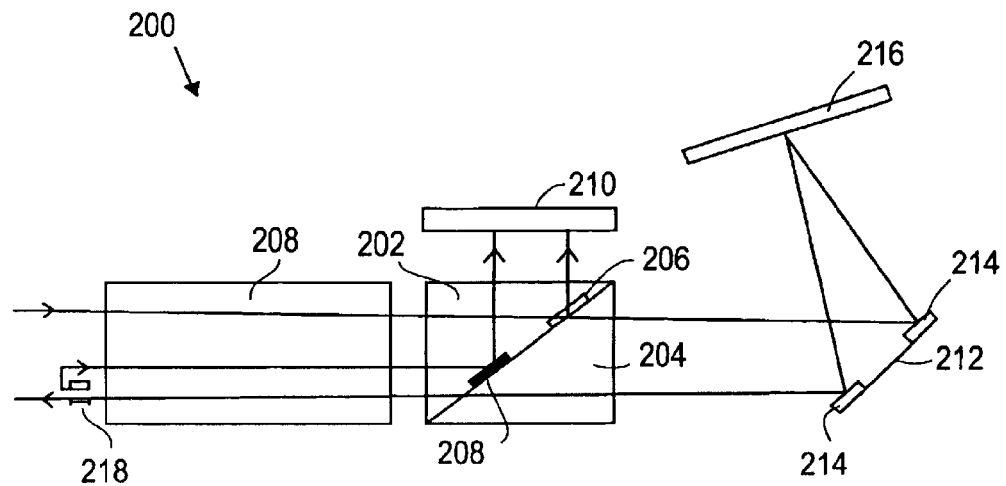
FIG. 11 is a cross-sectional view of a switch with two transmissive components that are secured to each other with beam splitting and reflective features between the transmissive components.

FIG. 10 illustrates a switch 180 according to a further embodiment of the invention having a transparent housing 182. The transparent housing 182 has two outer surfaces 184 and 186 that meet at an apex and are both inclined relative to a plane of a mirror substrate 190. Two transmissive components 192 and 194 with a partially transmissive mirror layer between them are mounted to the inclined surface 184. A reflective substrate 194 is secured to the surface 186. An intended advantage of the switch 180 is that the housing 182 provides protection against contaminants that may land on mirrors on the mirror substrate 190. The switch 180 of FIG. 10 is substantially the same as the switch 160 of FIG. 9 in other respects. FIG. 11 illustrates a switch 200 similar to the switch 10 of FIG. 1 which, instead of the top portion 36 and the transmissive substrate 70 of the switch 10 of including FIG. 1, includes first and second transmissive components 202 and 204. An optical splitter mirror 206 and a reflective mirror 208 are located between inclined surfaces of the transparent components 202 and 204.

The switch 200 operates in substantially the same manner as the switch 10 of FIG. 1 and also includes a fiber block 208, a photodetector array 210, a mirror substrate 212, pivoting mirrors 214, a reflective substrate 216, and optical couplers 218 operate in a similar manner. No lens plate is provided, but a surface of the second transmissive substrate may be profiled such as in FIG. 6, FIG. 7, or FIG. 8.

Figure 12:
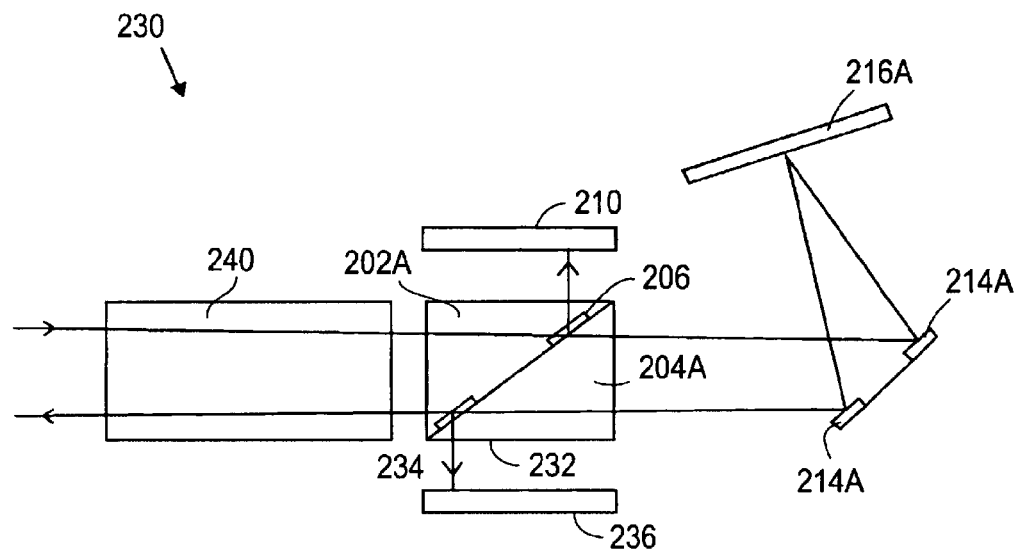
FIG. 12 is a cross-sectional view of a switch in which a light beam is detected after being reflected by an output pivoting mirror and before being coupled into an output optical fiber.

FIG. 12 illustrates a switch 230 according to a further embodiment of the invention. The switch 230 is similar to the switch 200, except that no provision is made for optical couplers and monitoring optical fibers. Instead, a second optical splitter mirror 232 is located between inclined surfaces of transparent components 202A and 204A. The optical splitter mirror 232 is located in a path of a light beam exiting the switch 230—i.e., after being reflected by pivoting mirrors 214A and a reflective substrate 216A. An output reflected portion 234 is propagated to a photodetector array 236 located on a side of the switch that is opposite from a photo-detect array 210A, which detects an input monitoring portion. An intended advantage of the switch 230 of FIG. 12 is that there is a cost saving because of the absence of the couplers 218. However, the monitoring portion 234 of switch 230 of FIG. 12 does not provide a direct measurement of coupling of a light beam into an output fiber in a lens block 240 thereof.

Figure 13:
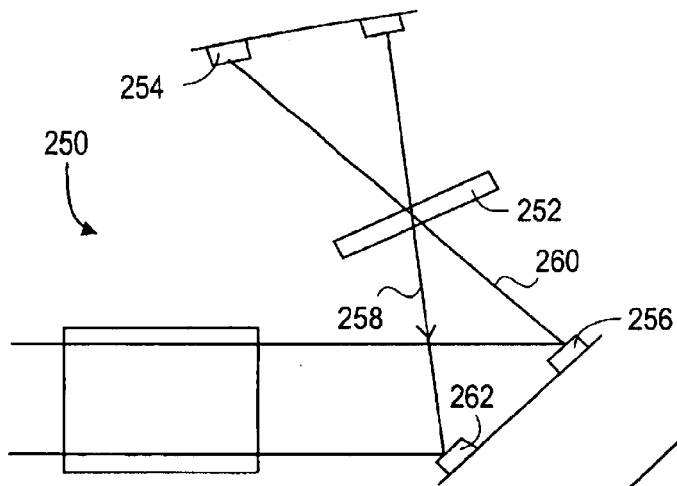
FIG. 13 is a cross-sectional view of a switch wherein a reflective substrate thereof is partially transmissive and input photodetectors are located behind the reflective substrate to detect functioning of an input pivoting mirror thereof.

FIG. 13 illustrates a switch 250 according to a further embodiment of the invention, wherein a reflective substrate 252 thereof is also partially transmissive. An output detector 254 is located behind the reflective substrate 252 to detect light being reflected from an input pivoting mirror. An electric signal generated by the photodetector 254 provides an indication of a propagated portion 258 of a light beam 260, the propagated portion 258 being propagated to an output pivoting mirror 262. The functioning of the input pivoting mirror 256 can be monitored, although the functioning of the output pivoting mirror 262 is not be monitored.

Figure 14:
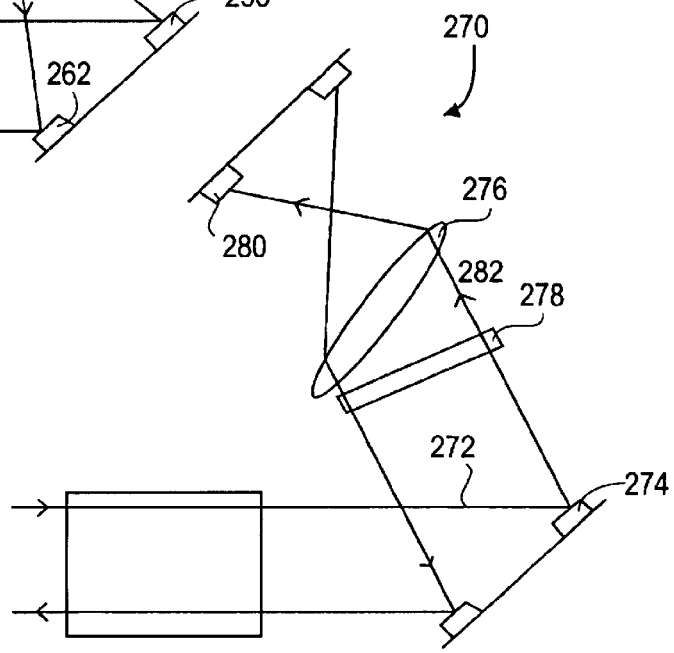
FIG. 14 is a cross-sectional view of a switch having a reflective substrate that is also partially transmissive, a mapping lens, and input photodetectors located behind the mapping lens.

FIG. 14 illustrates a switch 270 that provides an indication of a light beam 272 before being reflected by an input pivoting mirror 274. A mapping lens 276 is located between a partially transmissive reflective substrate 278 and an input photodetector 280 on a detector substrate. A monitoring portion 282 of the light beam 272 is received by the input detector 280 regardless of the orientation of the input mirror 274. A malfunction in the mirror 274 would thus go undetected. This differs from the way the switch 250 of FIG. 13 functions. In the switch 250, light only falls on the output detector 254 if the input pivoting mirror 256 is in a selected orientation and not when the input pivoting mirror 256 is rotated out of the selected orientation.

Figure 15:
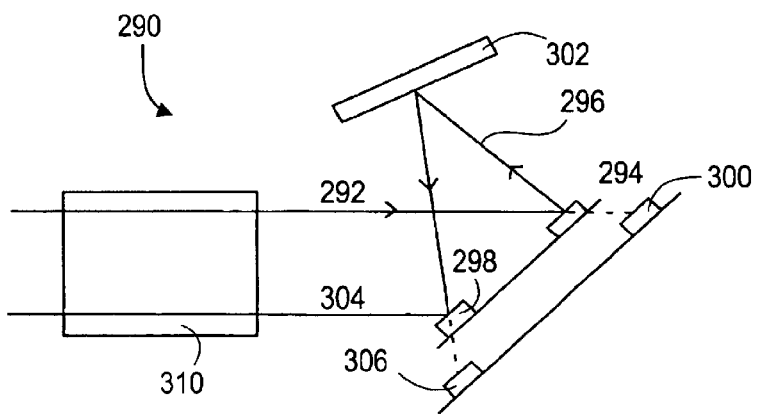
FIG. 15 is a cross-sectional view of a switch wherein input and output pivoting mirrors thereof are partially transmissive and input and output photodetectors are located behind the input and output pivoting mirrors.

FIG. 15 illustrates a switch 290 according to a further embodiment of the invention, which allows for detection of both a light beam 292 before being reflected by an input pivoting mirror 294 and detection of a propagated portion 296 of the light beam 292 after being reflected by the input pivoting mirror 294 but before being reflected by an output pivoting mirror 298. The pivoting mirrors 294 and 298 are partially transmissive. When the light beam 292 falls on the input pivoting mirror 294, a propagated portion 296 of the light beam 292 is reflected by the input pivoting mirror 294. An input monitoring portion passes through the input pivoting mirror 294 onto an input detector 300 located on a detector substrate behind the input pivoting mirror 294. The input propagated portion 296 is reflected by a reflective substrate 302 towards the output pivoting mirror 298. An output propagated portion 304 is reflected by the output pivoting mirror 298 and an output monitoring portion propagates through the output pivoting mirror 298 onto an output photodetector 306 located on the same detector substrate as the input detector 300. An electric signal generated by the input detector 300 provides an indication of the light beam 292 regardless of the orientation of the input pivoting mirror 294. An electric signal generated by the output detector 306 depends on the direction on which the input propagated portion 296 is reflected by the input pivoting mirror 294, and thus provides an indication of the functioning of the input pivoting mirror 294. The switch 290, however, does not provide an indication of the functioning of the output pivoting mirror 298. Incorrect pivoting of the output pivoting mirror 298 could result in the output propagated portion 304 not being coupled into the correct output optical fiber in a fiber block 310, and would go undetected.

In the foregoing specification, the invention has been described with reference to specific exemplary embodiments thereof. It will, however, be evident that various modifications and changes may be made thereto without departing from the broader spirit and scope of the invention as set forth is the appended claims. For example, the subject invention may be employed in protection input-output component, intermediate switch stages (e.g. close switches) etc. The specification and drawings are, accordingly, to be regarded in an illustrative rather than a restrictive sense.

What is claimed:

1. An optical switch, comprising:
   an input optical fiber to propagate a light beam;
   a mirror substrate;
   an input pivoting mirror located in a path of the light beam after leaving the input optical fiber, the input pivoting mirror being pivotally secured to the mirror substrate, pivoting of the input pivoting mirror relative to the mirror substrate altering an angle with which the light beam is reflected therefrom;
   an output optical fiber, having an end through which the light beam enters after being reflected by the input pivoting mirror;
   a first optical splitter located in a path of the light beam after leaving the input optical fiber; and
   a first optical detector, the first optical splitter splitting the light beam into a first propagated portion and a first monitoring portion, the first propagated portion being propagated through the output optical fiber and the first monitoring portion being received by the first optical detector, wherein the first optical splitter splits the light beam at a location after leaving the input optical fiber, and the first optical splitter is a partially transmissive optical splitter mirror that propagates one, and reflects the other one, of the first propagated portion and the first monitoring portion.

2. The optical switch of claim 1 wherein the first optical splitter splits the light beam after being reflected by the input pivoting mirror.

3. The optical switch of claim 1 wherein the first optical splitter splits the light beam after entering the output optical fiber.

4. The optical switch of claim 3 wherein the first optical splitter is an optical splitting coupler located in the output optical fiber, further comprising:
   a monitoring optical fiber connected to the coupler so that the first propagated portion propagates from the coupler through the output optical fiber, and the first monitoring portion propagates through the monitoring optical fiber to the first optical detector.

5. The optical switch of claim 1 wherein the first optical splitter is an input optical splitter that splits the light beam at a location before being reflected by the input pivoting mirror, the first propagated portion being an input propagated portion, the first monitoring portion being an input monitoring portion and the first detector being an input detector, further comprising:
   an output optical splitter located in a path of the light beam at a location after being reflected by the input pivoting mirror; and
   an output detector, the output optical splitter splitting the input propagated portion into an output propagated portion and an output monitoring portion, the output propagated portion being propagated through the output optical fiber and the output monitoring portion being detected by the output detector.

6. The optical switch of claim 5 further comprising:
   a transmissive substrate, the input optical splitter being a first, partially transmissive input optical splitter mirror, on the transmissive substrate, that propagates the input propagated portion therethrough and reflects the input monitoring portion therefrom, and the output optical splitter being an output optically spiting coupler located in the output fiber;
   a monitoring optical fiber being connected to the coupler so that the output propagated portion is propagated through the output optical fiber and the output monitoring portion is propagated through the monitoring optical fiber; and
   a second, reflective mirror on the transmissive substrate, that reflects the light beam, after leaving the monitoring optical fiber, towards the output optical detector.

7. The optical switch of claim 6 wherein the input propagated portion propagates through the transmissive substrate after being reflected by the input pivoting mirror and before entering the output optical fiber.

8. The optical switch of claim 1 wherein the optical detector is a photodetector that generates an electric signal dependent on an intensity of the first monitoring portion.

9. An optical switch comprising:
an input optical fiber to propagate a light beam;
a mirror substrate;
an input pivoting mirror located in a path of the light beam after leaving the input optical fiber, the input pivoting mirror being pivotally secured to the mirror substrate, pivoting of the input pivoting mirror relative to the mirror substrate altering an angle with which the light beam is reflected therefrom;
an output optical fiber, having an end through which the light beam enters after being reflected by the input pivoting mirror;
a first optical splitter located in a path of the light beam after leaving the input optical fiber;
an output pivoting mirror that is pivotal relative to the mirror substrate, the light beam being reflected by the output pivoting mirror after being reflected by the input pivoting mirror but before entering an output optical fiber; and
a first optical detector, the first optical splitter splitting the light beam into a first propagated portion and a first monitoring portion, the first propagated portion being propagated through the output optical fiber and the first monitoring portion being received by the first optical detector.

10. The optical switch of claim 9 wherein the first optical splitter splits the light beam after a being reflected by the output pivoting mirror.

11. The optical switch of claim 9 further comprising:
a reflective substrate having a reflective surface that reflects the light beam after being reflected by the input pivoting mirror but before being reflected by the output pivoting mirror.

12. The optical switch of claim 11 wherein the output pivoting mirror is pivotally mounted to the mirror substrate and is substantially in a common plane as the input pivoting mirror.

13. The optical switch of claim 12 wherein the first optical splitter is an input optical splitter that splits the light beam at a location before being reflected by the input pivoting mirror, the first propagated portion being an input propagated portion, the first monitoring portion being an input monitoring portion and the first detector being an input detector, further comprising:
an output optical splitter located in a path of the light beam at a location after being reflected by the input pivoting mirror; and
an output detector, the output optical splitter splitting the input propagated portion into an output propagated portion and an output monitoring portion, the output propagated portion being propagated through the output optical fiber and the output monitoring portion being received by the output detector.

14. The optical switch of claim 13 further comprising:
a transmissive substrate, the input optical splitter being a first, partially transmissive input optical splitter mirror, on the transmissive substrate, that propagates the input propagated portion therethrough and reflects the input monitoring portion therefrom, and the output optical splitter is an output optically splitting coupler located in the output fiber;
a monitoring optical fiber being connected to the coupler so that the output propagated portion is propagated through the output optical fiber and the output monitoring portion is propagated through the monitoring optical fiber; and
a second, reflective mirror on the transmissive substrate, that reflects the light beam, after leaving the separator optical fiber, towards the output optical detector.

15. The optical switch of claim 14 wherein the input propagated portion propagates through the transmissive substrate after being reflected by the input pivoting mirror and before entering the output optical fiber.

16. The optical switch of claim 15 wherein the transmissive substrate is a planar substrate being mounted to the housing at an angle other than 90° with respect to the light beam being propagated therethrough.

17. The optical switch of claim 14 comprising:
a plurality of said input optical fibers, each propagating a respective light beam;
a plurality of said input pivoting mirrors, each reflecting a respective light beam;
a plurality of said output pivoting mirrors, each reflecting a respective light beam;
a plurality of said output optical fibers, each propagating a respective light beam.

18. The optical switch of claim 17 comprising:
one or more of said partially transmissive input optical splitter mirrors splitting each light beam into a respective input propagated portion and a respective input monitoring portion;
a plurality of said input detectors each detecting a respective input monitoring portion;
a plurality of said couplers, each being located in a respective output fiber;
a plurality of said monitoring optical fibers, each connected to a respective coupler to propagate a respective output detector portion;
one or more of said second reflective mirrors reflecting the output monitoring portions; and
a plurality of said output detectors, each receiving a respective output monitoring portion.

19. The optical switch of claim 12 further comprising a transmissive mirror array cover located over the input and output pivoting mirrors, having at least one inclined surface that is inclined with respect to the mirror substrate and through which the light beam propagates.

20. The optical switch of claim 19 wherein the mirror substrate extends in a mirror substrate plane, the light beam propagates at a substrate light beam angle relative to the mirror substrate plane towards the mirror substrate and the inclined surface extends at an angle relative to the mirror substrate plane, the light beam propagating at an inclined surface-light beam angle that is more than the substrate-light beam angle towards the inclined surface.

21. The optical switch of claim 20 wherein the inclined surface-light beam angle is substantially 90°.

22. The optical switch of claim 21 wherein the light beam leaves the cover at an angle that is substantially 90°.

23. The optical switch of claim 1 further comprising:
a plurality of said detectors;
a plurality of output lines, each output line being connected to more than one of said detectors.

24. The optical switch of claim 23 wherein there are more detectors than output lines.

25. The optical switch of claim 23 further comprising:
a plurality of sample lines, each sample line being connected to a respective detector.

26. The optical switch of claim 25 wherein there are at least as many detectors as the sample lines multiplied by output lines.

27. The optical switch of claim 1 further comprising:
a first transparent component, the first optical splitter being a partially transmissive mirror layer on a surface of the first transparent component; and
a second transparent component on the partially transmissive mirror layer so that the partially transmissive mirror layer is located between the first and second transparent components.

28. The optical switch of claim 27 wherein a selected one of the first transparent components has a first surface through which the light beam enters into the selected transparent component and a second surface through which the light beam leaves the selected transparent component, the second surface being at an angle other than 90° relative to a direction of the light beam upon reaching the second surface.

29. The optical switch of claim 28 wherein the respective light beams converge away from the second surface.

30. The optical switch of claim 29 wherein the second surface includes at least two flat sections, the light beam passing through both flat sections.

31. The optical switch of claim 29 wherein the second surface has a curvature.

32. The optical switch of claim 29 wherein the second surface forms a plurality of individual curved lenses.

33. The optical switch of claim 28 wherein the second surface forms a plurality of individual curved lenses.

34. The optical switch of claim 33 wherein a respective light beam travels through a respective individual curved lens.

35. The optical switch of claim 33 wherein one light beam passes through two of the individual curved lenses.

36. The optical switch of claim 27 further comprising a transparent housing to which the second transparent components are mounted.

37. The optical switch of claim 36 wherein the transparent housing has at least one outer surface at an angle relative to a plane of the mirror substrate, the second transparent component having a first surface through which the light beam enters into the second transparent component, and a second surface through which the light beam leaves the second transparent component, the second surface being substantially parallel to the outer surface.

38. The optical switch of claim 37 wherein the second surface is mounted to the outer surface.

39. The optical switch of claim 38 wherein the transparent housing has a second outer surface at an angle relative to the plane of the mirror substrate, further comprising:
a reflective substrate mounted over the second outer surface.

40. The optical switch of claim 27 wherein the first optical splitter splits the light beam after entering the output optical fiber.

41. The optical switch of claim 40 wherein the first optical splitter is an optical splitting coupler located in the output optical fiber, further comprising:
a monitoring optical fiber connected to the coupler so that the first propagated portion propagates from the coupler through the output optical fiber and the first monitoring portion propagates through the monitoring optical fiber to the first optical detector.

42. The optical switch of claim 27 wherein the first optical splitter is an input optical splitter that splits the light beam at a location before being reflected by the input pivoting mirror, the first propagated portion being an input propagated portion, the first monitoring portion being an input monitoring portion and the first detector being an input detector, further comprising:

an output optical splitter located in a path of the light beam at a location after being reflected by the input pivoting mirror; and
an output detector, the output optical splitter splitting the input propagated portion into an output propagated portion and an output monitoring portion, the output propagated portion being propagated through the output optical fiber and the output monitoring portion being received by the output detector.

43. The optical switch of claim 1 further comprising:
an output pivoting mirror that is pivotal relative to the mirror substrate, the light beam being reflected by the output pivoting mirror after being reflected, by the input pivoting mirror but before entering the output optical fiber, wherein the first optical splitter splits the light beam after being reflected by the input pivoting mirror but before being reflected by the output pivoting mirror.

44. The optical switch of claim 43 further comprising:
a reflective substrate having a reflective surface that reflects the light beam after being reflected by the input pivoting mirror but before being reflected by the output pivoting mirror, wherein the reflective substrate is the first optical splitter, the first propagated portion being reflected by the reflective substrate and the first monitoring portion propagating through the reflective substrate.

45. The optical switch of claim 44 wherein the detector receives the first monitoring portion when the input pivoting mirror is in a selected orientation and not when the input pivoting mirror is out of the selected orientation.

46. The optical switch of claim 44 further comprising:
a lens between the reflective substrate and the detector.

47. The optical switch of claim 46 wherein the detector receives the first monitoring portion regardless of an orientation of the input pivoting mirror.

48. The optical switch of claim 9 wherein at least one of the pivoting mirrors is the first optical splitter, the respective pivoting mirror being partially transmissive so that the first propagated portion is reflected by the pivoting mirror and the monitoring portion is propagated through the pivoting mirror.

49. The optical switch of claim 48 wherein both the input and output pivoting mirrors are partially transmissive, the first propagated portion being reflected by the input pivoting mirror, the input monitoring portion being propagated by the input pivoting mirror, the first propagated portion being partially reflected by the output pivoting mirror in the form of an output propagated portion and partially propagated in the form of an output monitoring portion.

50. The optical switch of claim 49 wherein the detector is an input detector located behind the input pivoting mirror, further comprising:
an output detector located behind the output pivoting mirror.

51. An optical switch, comprising:
a housing;
an input optical fiber, to propagate a light beam, secured to the housing;
a mirror substrate secured to the housing;
an input pivoting mirror located in a path of the light beam after leaving to input optical fiber, the input pivoting mirror being pivotally secured to the mirror substrate, pivoting of the input pivoting mirror relative to the mirror substrate altering an angle with which the light beam is reflected therefrom;

an output optical fiber, having an end through which the light beam enters after being reflected by the input pivoting mirror;

a first optical splitter located in a path of the light beam after leaving the input optical fiber;

a first optical detector, the first optical splitter splitting the light beam into a first propagated portion and a first monitoring portion, the first propagated portion being propagated through the output optical fiber and the first monitoring portion being received by the first optical detector, wherein the first optical splitter splits the light beam at a location after leaving the input optical fiber; and an output pivoting mirror that is pivotal relative to the mirror substrate, the light beam being reflected by the output pivoting mirror after being reflected by the input pivoting mirror but before entering the output optical fiber, wherein the first optical splitter splits the light beam after being reflected by the input pivoting mirror but before being reflected by the output pivoting mirror.

52. The optical switch of claim 51 wherein the first optical splitter splits the light beam after being reflected by the input pivoting mirror.

53. The optical switch of claim 52 wherein the first optical splitter is a partially transmissive optical splitter mirror that propagates one, and reflects the other one, of the first propagated portion and the first monitoring portion.

54. The optical switch of claim 51 wherein the first optical splitter is an input optical splitter that splits the light beam at a location before being reflected by the input pivoting mirror, the first propagated portion being an input propagated portion, the first monitoring portion being an input monitoring portion and the first detector being an input detector, further comprising:

an output optical splitter located in a path of the light beam at a location after being reflected by the input pivoting mirror; and an output detector, the output optical splitter splitting the input propagated portion into an output propagated portion and an output monitoring portion, the output propagated portion being propagated through the output optical fiber and the output monitoring portion being detected by the output detector.

55. An optical switch comprising:

a housing;

a retaining block on the housing;

a plurality of input optical fibers each to propagate a respective light beam, secured to the retaining block;

a mirror substrate secured to the housing;

a plurality of input pivoting mirrors, each located in the path of a respective light beam leaving a respective input optical fiber, and each being pivotally secured to the mirror substrate, pivoting of the respective input pivoting mirror relative to the mirror substrate altering an angle with which the light beam is reflected therefrom;

a reflecting substrate mounted to the housing and positioned to reflect the light beams after being reflected by the input pivoting mirrors;

a plurality of output pivoting mirrors, each located in a path of a respective light beam after being reflected by the reflective substrate, and each being pivotally secured to the mirror substrate, pivoting of a respective output pivoting mirror relative to the mirror substrate altering an angle with which the light beam is reflected therefrom;

a plurality of output optical fibers secured to the retained block, a respective light beam coupling into a selected output optical fiber after being reflected by a respective output pivoting mirror;

a first optical splitter located in a path of each light beam after leaving the input optical fiber but before being reflected by the input pivoting mirrors;

a first optical detector, the first optical splitter splitting the light beam into a first propagated portion and a first monitoring portion, the first propagated portion being propagated through the output optical fiber and the first monitoring portion being received by the first optical detector.

56. A method of switching light, comprising:

propagating a light beam from an input optical fiber;

reflecting the light beam from an input pivoting mirror after leaving the input optical fiber;

pivoting the input pivoting mirror;

propagating the light beam through an output optical fiber, pivoting of the input pivoting mirror ensuring coupling of the light beam with the output optical fiber;

splitting the light beam into a first propagated portion and a first monitoring portion, the first propagated portion being propagated through the output optical fiber;

splitting the light beam after leaving the input optical fiber but before being reflected from the pivoting mirror; and receiving the first monitoring portion.

* * * * *